United States Patent
Park et al.

(10) Patent No.: US 9,487,405 B2
(45) Date of Patent: Nov. 8, 2016

(54) METHOD FOR MANUFACTURING SIC POWDERS WITH HIGH PURITY

(71) Applicant: KOREA INSTITUTE OF SCIENCE AND TECHNOLOGY, Seoul (KR)

(72) Inventors: Sang Whan Park, Seoul (KR); Kyoung Sop Han, Seoul (KR); Sung Ho Yun, Gwangmyeong-si (KR); Jin Oh Yang, Seoul (KR); Gyoung Sun Cho, Guri-si (KR); Mi Rae Youm, Seoul (KR); Yung Chul Jo, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 738 days.

(21) Appl. No.: 13/826,521

(22) Filed: Mar. 14, 2013

(65) Prior Publication Data
US 2013/0243682 A1    Sep. 19, 2013

(30) Foreign Application Priority Data
Mar. 14, 2012    (KR) .......................... 10-2012-0025947

(51) Int. Cl.
    *C01B 31/36*    (2006.01)
(52) U.S. Cl.
    CPC ..................................... *C01B 31/36* (2013.01)
(58) Field of Classification Search
    None
    See application file for complete search history.

(56) References Cited

U.S. PATENT DOCUMENTS

| | | | |
|---|---|---|---|
| 4,302,372 A * | 11/1981 | Fujiwara | C04B 35/565 423/345 |
| 4,571,331 A | 2/1986 | Endou et al. | |
| 4,676,966 A | 6/1987 | Endo et al. | |
| 5,863,325 A | 1/1999 | Kanemoto et al. | |
| 6,554,897 B2 * | 4/2003 | Golan | C30B 23/00 117/107 |
| 6,627,169 B1 | 9/2003 | Itoh et al. | |
| 2009/0220788 A1 * | 9/2009 | Barrett | C01B 31/36 428/402 |

FOREIGN PATENT DOCUMENTS

| | | |
|---|---|---|
| JP | 2002-326876 | 11/2002 |
| JP | 2006-025937 | 2/2006 |
| JP | 2006-256937 | 9/2006 |
| KR | 10-1994-0000105 | 1/1994 |
| KR | 10-1996-0012110 | 9/1996 |

* cited by examiner

*Primary Examiner* — Guinever S Gregorio

(57) ABSTRACT

Disclosed herein is a method for manufacturing SiC powders with a high purity, and more particularly, a method for manufacturing SiC powders with a high purity by reating a solid phase carbon source as raw materials with gas phase silicon sources generated from a starting material composed of metallic silicon and silicon dioxide powders and, in which it is easy to control the size and crystalline phase of the SiC powders by changing the compositions of the gas phase silicon source to the solid phase carbon source mole ratio, and the temperature and time for the heat treatment.

9 Claims, No Drawings

METHOD FOR MANUFACTURING SIC POWDERS WITH HIGH PURITY

CROSS-REFERENCE TO RELATED APPLICATIONS

This application claims priority to and the benefit of Korean Patent Application No. 10-2012-0025947 filed in the Korean Intellectual Property Office on Mar. 14, 2012, the entire contents of which are incorporated herein by reference.

TECHNICAL FIELD

The present disclosure relates to processing methods for manufacturing SiC powders with a high purity having various particle sizes and crystal phases by a solid phase carbon source and gas phase silicon sources that are generated from a starting material consisting of metallic silicon and silicon dioxide powder through high temperature heat treatments under vacuum atmosphere or an argon (Ar) atmosphere.

BACKGROUND ART

Materials generally used in the semiconductor process are required to have a high purity and a corrosion resistance, and thus quartz has been usually used as fixtures for semiconductor processes. However, as the processing temperature and the size of silicon wafer in semiconductor processes are increased, quartz incurs many problems as fixtures for semiconductor processes. That is, quartz has a thermal expansion coefficient difference with a silicon wafer and a low frature strength, and thus has limitations to be applied to the next-generation semiconductor process in which a 450 mm-level silicon wafer and a 20 nm-level line width are expected to be proceed. Accordingly, it is required that an alternative material is developed. The reaction bonded SiC has been recognized as a typical candidate material for high temperature semiconductor processes, which may substitute for quartz.

A typical reaction bonded SiC fixtures has a high content of metallic impurities, which is approximately from 10 ppm to 100 ppm, and thus reaction bonded SiC with a high purity is essentially needed in order to use reaction bonded SiC as a material for high temperature semiconductor processes. SiC fixtures for the use in high temperature semiconductor processes is generally manufactured by sintering process using SiC powders with a purity of less than 10 ppm at the high temperature, but as the super-high integration proceeds in the semiconductor process, it is likely that the purity required in the SiC powders used as a starting material for SiC fixtures used in high temperature semiconductor processes is also increased. For the applications a reaction bonded SiC fixtures for high temperature semiconductor processes, a chemical vapor deposition (CVD) SiC coating process has been used to make a high purity SiC layer having an impurity content of 1 ppm or less on the surface of the reaction bonded SiC, but there are problems in a CVD SiC coating layer such as the occurrence of cracks that generally caused by repeated semiconductor high temperature processes.

In a general method of manufacturing a reaction bonded SiC, the reaction bonded SiC is prepared by infiltrating molten Si into a green body made of SiC powders and a carbon source material, and the purity of SiC powders used as a raw material needs to be increased in order to increase the purity of the reaction bonded SiC. Recently, the application of an SiC single crystal substrate that may be substituted for an Si semiconductor in the semiconductor field used for high temperature and high power applications has been increased, and an SiC single crystal has been also applied as a substrate for the GaN epitaxial growing for LED. In a method of preparing SiC single crystals, SiC powders used as a raw material are generally sublimated into the gas phase at an ultra high temperature and then condensed to grow the resulting SiC single crystals. The biggest problem in manufacturing SiC single crystals is generation of defects occurring during the preparation of SiC crystals, and it is essential to use SiC powders with a high purity in order to prepare SiC single crystals with a low defect concentration. Further, granular SiC powders with a high purity are generally used in growing SiC single crystals by a sublimation method.

Accordingly, in order to manufacture a SiC fixtures with a high purity, it is essentially required that SiC powders used as a raw material thereof become highly pure.

According to methods for manufacturing SiC powders which have been reported until now, various silicon sources and carbon sources in the solid, liquid and gas phases are used to synthesize SiC powders under vacuum or inert gas atmospheres at a high temperature. The Acheson method that is a representative method of manufacturing SiC powders may be an economical method as a process of manufacturing alpha-phase SiC powders. However, the resulting SiC powders have a purity of 99.99% or less since a series of powdering processes including pulverizing the SiC ingots manufactured by the Acheson method need to be additionally performed, the powdering process of which provides an opportunity to incorporate impurities; and as a result, an additional purification process such as acid treatment needs to be performed to increase the purity of resulting SiC powders. Accordingly, SiC powders manufactured by the general method are not appropriate for use as raw powders to manufacture SiC fixtures for high temperature semiconductor processes and SiC single crystals that require SiC powders with a purity higher than 99.999. In addition, there are methods for manufacturing beta-phase SiC powders with a high purity by a gas phase reaction using gas phase raw materials including a silicon source and a carbon source in the gas phase, but the productivity is low, manufacturing costs are high, and there are many difficulties in manufacturing granular SiC powders. Although there are methods of manufacturing SiC powders by thermal pyrolysis of organic silicon compounds such as a methyl hydrogen silane-based compound simultaneously including silicon source and carbon source [U.S. Pat. Nos. 4,571,331 and 4,676,966], SiC powders manufactured by the methods are highly pure, but resulting SiC powders having a size from 0.01 um to 1 um, and are usually used in the preparation of SiC fixtures by a hot pressing process for high-purity semiconductor processes as well as LED process.

Recently, methods of using organic compounds of liquid phase silicon source and carbon source or using a liquid phase carbon source and a solid phase silicon source such as silica have been known in order to synthesize SiC powders with a high purity. Synthesis methods of SiC powders with a high purity using liquid phase organic compounds as a silicon source and a carbon source are disclosed in Japanese Patent Application Laid Open Nos. 2002-326876, 2006-25937 and 2006-256937, U.S. Pat. Nos. 5,863,325 and 6,627,169, and the like. As the methods of using liquid phase organic compounds, disclosed are methods of manufacturing SiC powders with a high purity having a various size by performing the carbothermal reduction process under vacuum or inert gas atmospheres such as argon (Ar) at a high temperature using a hybrid SiO2-C mixture manufactured by a sol-gel process using liquid phase carbon compounds with a high purity, such as such as phenol resin, xylene-based resin or the like and various kinds of liquid phase silicon compounds with a high purity, such as ethyl silicate, silicon alkoxide, or silane. However, the process requires a heat treatment process under vacuum or inert gas atmospheres at a high temperature from 1,700° C. to 2,100° C. for a long time, and the time required for the high temperature heat treatment is long and the yield of synthesized SiC powders using an expensive liquid phase silicon source is low, and thus a market based on the mass production has not yet been formed due to high manufacturing costs.

Recently, a direct carbonization method of manufacturing granular SiC powders with a high purity by directly reacting a metallic silicon with a solid phase carbon has been disclosed in US Patent Application Publication No. 2009-0220788. This method discloses that ultra pure granular SiC powders with extremely low content of nitrogen, boron, and aluminum may be synthesized by heating silicon powders and carbon powders under vacuum atmosphere at a temperature of 1,200° C. for 12 hours and then maintaining under an atmosphere of $10^{-5}$ torr or less at 2,250° C. for 1 to 2 hours, and SiC single crystals having a low defect concentration and excellent insulating property may be manufactured by using the same. This method makes it possible to synthesize granular SiC powders, but is regarded as problematic in terms of mass production since granular SiC powders are manufactured under ultra high temperature and high vacuum.

SUMMARY OF THE INVENTION

The present disclosure has been made in an effort to provide a method for manufacturing SiC powders with a high purity by using silicon gas and silicon monoxide gas that are generated from a starting material consisting of metallic silicon and silicon dioxide powders, and a solid phase carbon source as raw materials.

An exemplary embodiment of the present disclosure provides a method for manufacturing SiC powders with a high purity, including:

i) mixing metallic silicon powders, silicon dioxide ($SiO_2$) powders and a thermoplastic resin and drying to obtain a starting material for manufacturing gas phase silicon sources;

ii) placing the starting materials for manufacturing gas phase silicon sources at a lower part of a graphite crucible, placing a graphite separator on the starting material for manufacturing a gas phase silicon source, placing a solid phase carbon source at an upper part of the graphite separator, and then closing a cover of the graphite crucible to constitute a reaction system for manufacturing SiC powders; and iii) subjecting the reaction system by heat treatment under vacuum atmosphere or argon atmosphere to synthesize the SiC powder.

SiC powder manufactured by the manufacturing method of the present disclosure has an average diameter in a range from 0.1 μm to 100 μm, is manufactured as a beta-phase crystalline or a mixed crystal of beta and alpha phases crystalline, and are advanatageous in that the size and crystalline phase of the SiC powder may be controlled by changing compositions of a gas phase silicon source to a solid phase carbon source mole ratio, and the temperature and time for the heat treatment simultaneously.

In the preparation method of the present disclosure, SiC powders with a high purity are directly manufactured, and thus there is no need to perform a purifying process caused by the incorporation of impurities during pulverization of SiC ingots, thereby obtaining an effect that the entire manufacturing process is simple and economical.

SiC powders prepared by the manufacturing method of the present disclosure have a high purity to a degree that the powders may be used as a raw material for manufacturing hot pressed SiC or reaction bonded SiC fixtures with a high purity and may be used as a raw material for manufacturing SiC single crystal by a sublimation method.

DETAILED DESCRIPTION

The present invention relates to a method for manufacturing SiC powders with a high purity by heat treating a solid carbon source with gas phase silicon sources generated from silicon sources consisting of metallic silicon and silicon dioxide powders used as starting materials at high temperature under vacuum atmosphere or inert atmosphere such as argon.

In the manufacturing method of the present invention, the particle size of SiC powders may be diversely controlled by changing the compositions of the silicon sources and the carbon source as well as the temperature and time for the heat treatment, and it is also possible to control the crystalline phase of the manufactured SiC powders into a beta phase or a mixture of beta and alpha phases by changing heating temperature.

The present invention as described above will be described in more detail as follows.

The step i) according to the present invention is to prepare a starting material for generating gas phase silicon sources. In the present invention, metallic silicon, silicon dioxide ($SiO_2$) powders and a thermoplastic resin are used in order to prepare starting materials for generating gas phase silicon sources.

The metallic silicon and silicon dioxide ($SiO_2$) powers included in the starting materials for generating silicon sources are converted into a silicon (Si) gas and a silicon monoxide (SiO) gas by heat treatment of iii), which will be subsequently performed, and then are used as gas phase silicon sources with a high purity in the manufacturing method of the present invention. The ratio of the metallic silicon and silicon dioxide ($SiO_2$) powders used as the starting materials for generating a silicon source may be maintained at a molar ratio of the metallic silicon:silicon dioxide=1:0.8 to 2.0. When the metallic silicon:silicon dioxide ratio thereof is less than 1:0.8 by a molar ratio, the amount of a gas phase silicon source which reacts with a carbon source for the synthesis of SiC powders becomes excessive, thereby generating a residual silicon. When the metallic silicon:silicon dioxide ratio thereof exceeds 1:2.0 by a molar ratio, the amount of a gas phase silicon source which reacts with a carbon source for the synthesis of SiC powders becomes insufficient, thereby generating a residual silicon.

For the purpose of promoting the conversion of metallic silicon and $SiO_2$ powders used as starting materials for manufacturing silicon sources into the silicon (Si) gas and the silicon monoxide (SiO) gas phase by a heat treatment, the present invention includes a thermoplastic resin in the starting materials. As the thermoplastic resin, it is possible to use a solid phase or liquid phase selected from phenol resins, polyethylene resins, acrylic resins and the like, and it is suitable to use a liquid phase thermoplastic resin subjected to a heat treatment at 900° C. for 2 hours to have a residual carbon content of 20% or more. In the embodiments of the present invention, examples in which a phenol resin is usually used are specifically exemplified, but the object of the present invention may be sufficiently accomplished even though other thermoplastic resins may be used instead. The thermoplastic resin may be used in an amount of 5% by weight or less and preferably in a range from 0.2% by weight to 2% by weight, based on the starting material for manufacturing a gas phase silicon source, and when the use amount thereof exceeds 5% by weight, the generation of gas phase silicon sources by a high temperature reaction may be rather suppressed.

Water or ethanol may be additionally used such that the starting materials prepared above are mixed well, and the water or ethanol is used preferably in a range from 20% by weight to 40% by weight based on the raw materials for generating a gas phase silicon source to reduce the time for mixing and drying raw materials.

The metallic silicon, silicon dioxide powders, and the thermoplastic resin prepared above, and water or ethanol if necessary are mixed, stirred at a speed from 100 rpm to 400 rpm for approximately 30 minutes to 2 hours to prepare a mixture, and then drying the mixture at a temperature from 60° C. to 90° C. for 12 hours to 24 hours to prepare a starting material for generating gas phase silicon sources.

The step ii) according to the present invention is to constitute a reaction system to synthesize SiC powders. That is, the step is to place the starting material for generating gas phase silicon sources prepared above and a carbon source in a graphite crucible with a high purity.

When more specifically described, the step is to place the starting material for generating gas phase silicon sources at the lowest part of the graphite crucible, placing a graphite separator on the starting material for generating gas phase silicon sources at a predetermined distance therefrom, placing a solid phase carbon source at an upper part of the graphite separator, and then closing a cover of the graphite crucible to constitute a reaction system to synthesize SiC powders.

In the present invention, a graphite crucible with a high purity is used as a reaction vessel.

In the present invention, a graphite separator is placed between the starting material generating gas phase silicon sources and the carbon source to construct a reaction system. The graphite separator has a thickness from 0.5 mm to 5 mm and holes having a diameter from 1 mm to 4 mm are present at 4 ea/cm$^2$ to 30 ea/cm$^2$ on the surface thereof, and thus the gas phase silicon sources produced from the lower part of the crucible passes through the holes of the separator and is reacted with the solid phase carbon source. Further, the graphite separator is placed at a predetermined distance from the starting material for manufacturing a gas phase silicon source, which is placed at the lower part of the crucible, and the reason thereof is to make it appropriate for the gas phase silicon source produced by the high temperature heat treatment to pass through the holes of the separator.

In the present invention, a solid phase carbon source is used as the carbon source, and specifically, it is preferred that amorphous carbon black powder, graphite powder and the like are used. The C/Si element molar ratio of the silicon source and the carbon source as the raw materials to be charged in the graphite crucible is maintained at preferably in a range from 0.7 to 2.0/1. When the C/Si element molar ratio is less than 0.7, a residual silicon may be generated. When the C/Si element molar ratio exceeds 2.0, a residual carbon may be generated.

It is preferred that the metallic silicon and silicon dioxide ($SiO_2$) powders as the silicon source, which are used in the present invention in order to synthesize SiC powders, and the carbon source do not include a metallic element such as B, Fe, Cu, Ni, Na, Ca, Cr, V and the like, which may be incorporated as impurities during the high temperature semiconductor process, or a raw material which contains the impurities in an amount of 5 ppm or less, is used.

The step iii) according to the present invention is to subject the reaction system prepared above to perform a heat treatment under vacuum atmosphere or argon atmosphere to synthesize SiC powders.

The heat treatment in the present invention is performed in a range from 1,200° C. to 2,100° C., and is preferably performed with a two-step process including subjecting the reaction system to a first heat treatment under vacuum atmosphere at a temperature from 1,200° C. to 1,400° C. for 1 hour to 5 hours, and then subjecting the reaction system to a second heat treatment under vacuum or argon atmosphere at a temperature from 1,700° C. to 2,100° C. for 1 hour to 5 hours. The particle size and crystalline phase of the synthesized SiC powders can be controlled by varying the C/Si element molar ratio of the silicon source and the carbon source as the raw materials as well as varying the temperature, time and atmospheres in the present disclosure in a two-step heat treatment process. As the temperature and time for the heat treatment usually were increased, the size of the synthesized SiC powders tended to be increased. Furthermore, beta-phase SiC powders was synthesized at the low heat treatment temperature, and as the heat treatment temperature was increased, a part of an alpha phase SiC powders, which is the high temperature crystalline phase, were synthesized.

The SiC powders synthesized according to the manufacturing method of the present invention have an impurity content of 5 ppm or less. Further, the average diameter of the beta phase SiC powders was in a range from 1 μm to 20 μm, and the average diameter of the SiC powders consisting of a mixed crystalline phase of the beta and alpha phases was in a range from 30 μm to 50 μm. Hereinafter, a method for manufacturing SiC powders with a high purity of the present invention will be described in more detail through the following Examples, but the present invention is not limited by the Examples.

EXAMPLE

Example 1

As starting materials of a silicon source, silicon ingots with a high purity having an average diameter of 10 mm and $SiO_2$ powders with a high purity having an average diameter of 4 μm were mixed at a molar ratio of 1:2, and then 30% by weight of ethanol and 1% by weight of a novolac type phenol resin were added thereto, mixed at 100 rpm for 1 hour, and then dried at a temperature of 80° C. for 12 hours to prepare a starting material for generating gas phase silicon sources.

The starting material for generating gas phase silicon sources prepared above was placed at the lower part of a graphite crucible with a high purity, and then a graphite separator with holes having an average diameter of 3 mm present at 9 ea/cm$^2$ was placed at an interval of 10 mm from the dried starting silicon source material so that the generated gas phase silicon source could move through the graphite seperator in the graphite crucible to react with the solid phase graphite source placed above the graphite seperator. Then, solid phase graphite powders with a high purity having an average diameter of 20 μm was placed on the separator such that the molar ratio of the C/Si elements was 0.8, thereby constituting a reaction system.

The graphite crucible in which the reaction system was constituted was subjected to a heat treatment under vacuum ($10^{-2}$ torr) atmosphere at a temperature of 1,300° C. for 1 hour, and then was subjected to a heat treatment under the argon atmosphere at a temperature of 2,100° C. for 5 hours to synthesize SiC powders.

As a result of XRD analysis on the synthesized SiC powders, it could be seen that alpha and beta phases co-existed, and the average diameter of the manufactured SiC powder was 50 μm. As a result of GDMS analysis, it was confirmed that the content of metallic impurities in the SiC powders synthesized in the present Example was 3 ppm or less.

Example 2

As starting materials of a silicon source, silicon powder with a high purity having an average diameter of 25 μm and silicon dioxide powder with a high purity having an average diameter of 10 μm were mixed at a molar ratio of 1:1.1, and then 40% by weight of ethanol and 2% by weight of a novolac type phenol resin were added thereto, mixed at 100 rpm for 1 hour, and then dried at a temperature of 80° C. for 12 hours to prepare a starting material for manufacturing a gas phase silicon source.

The starting material for manufacturing a gas phase silicon source prepared above was placed at the lower part of a graphite crucible with a high purity, and then a graphite separator with holes having an average diameter of 3 mm present at 9 ea/cm² was placed at an interval of 5 mm from the dried gas phase silicon source starting material so that the generated gas phase silicon source could move through the graphite seperator in the graphite crucible to react with the solid phase graphite source placed above the graphite seperator. Then, solid phase carbon black powders with a high purity having an average diameter of 18 nm was placed on the separator such that the molar ratio of the C/Si elements was 1.2, thereby constituting a reaction system.

The graphite crucible in which the reaction system was constituted was subjected to a heat treatment under vacuum ($10^{-2}$ torr) atmosphere at a temperature of 1,300° C. for 5 hours, and then was subjected to a heat treatment under vacuum ($10^{-2}$ torr) atmosphere at a temperature of 1,700° C. for 2 hours to manufacture SiC powder.

As a result of XRD analysis on the manufactured SiC powder, it could be seen that the crystalline phase was a beta crystalline, and the average diameter of the manufactured SiC powder was 2 μm. As a result of GDMS analysis, it was confirmed that the content of impurities in the SiC powder synthesized in the present Example was 5 ppm or less.

Example 3

As starting materials of a silicon source, silicon powder having an average diameter of 40 μm and silicon dioxide powder having an average diameter of 8 μm were mixed at a molar ratio of 1:1, and then 40% by weight of ethanol and 2% by weight of a novolac type phenol resin were added thereto, mixed at 200 rpm for 1 hour, and then dried at a temperature of 80° C. for 12 hours to prepare a starting material for manufacturing a gas phase silicon source.

The starting material for manufacturing a gas phase silicon source prepared above was placed at the lower part of a graphite crucible with a high purity, and then a graphite separator with holes having an average diameter of 3 mm present at 9 ea/cm² was placed at an interval of 10 mm from the dried gas phase silicon source starting material so that the generated gas phase silicon source could move through the graphite seperator in the graphite crucible to react with the solid phase graphite source placed above the graphite seperator. Then, solid phase graphite powders with a high purity having an average diameter of 5 μm was placed on the separator such that the molar ratio of the C/Si elements was 1, thereby constituting a reaction system.

The graphite crucible in which the reaction system was constituted was subjected to a heat treatment under vacuum ($10^{-2}$ torr) atmosphere at a temperature of 1,300° C. for 5 hours, and then was subjected to a heat treatment under argon atmosphere at a temperature of 2,050° C. for 3 hours to manufacture SiC powder.

As a result of XRD analysis on the SiC powder manufactured, it could be seen that alpha and beta phases co-existed, and the average diameter of the manufactured SiC powder was 30 μm. As a result of GDMS analysis, it was confirmed that the content of impurities in the SiC powder synthesized in the present Example was 3 ppm or less.

Example 4

As starting materials of a silicon source, silicon powder having an average diameter of 40 μm and silicon dioxide powder having an average diameter of 20 μm were mixed at a molar ratio of 1:1, and then 40% by weight of ethanol and 2% by weight of a novolac type phenol resin were added thereto, mixed at 100 rpm for 1 hour, and then dried at a temperature of 80° C. for 12 hours to prepare a starting material for manufacturing a gas phase silicon source.

The starting material for manufacturing a gas phase silicon source prepared above was placed at the lower part of a graphite crucible with a high purity, and then a graphite separator with holes having an average diameter of 3 mm present at 9 ea/cm² was placed at an interval of 10 mm from the dried gas phase silicon source starting material so that the generated gas phase silicon source could move through the graphite seperator in the graphite crucible to react with the solid phase graphite source placed above the graphite seperator. Then, solid phase graphite powders with a high purity having an average diameter of 5 μm was placed on the separator such that the molar ratio of the C/Si elements was 1, thereby constituting a reaction system.

The graphite crucible in which the reaction system was constituted was subjected to a heat treatment under vacuum ($10^{-2}$ torr) atmosphere at a temperature of 1,300° C. for 5 hours, and then was subjected to a heat treatment under argon atmosphere at a temperature of 1,800° C. for 3 hours to manufacture SiC powder.

As a result of XRD analysis on the manufactured SiC powder, it could be seen that the crystalline phase was a beta crystalline, and the average diameter of the manufactured SiC powder was 15 μm. As a result of GDMS analysis, it was confirmed that the content of impurities in the SiC powder synthesized in the present Example was 3 ppm or less.

What is claimed is:
1. A method for synthesizing SiC powders, comprising:
   i) mixing and drying metallic silicon, silicon dioxide ($SiO_2$) powders and a thermoplastic resin to prepare a starting material for generating gas phase silicon sources, wherein a ratio of the metallic silicon to silicon dioxide ($SiO_2$) powders is in a range from 1:0.8 to 2.0 by a molar ratio;

ii) placing the starting material for generating gas phase silicon sources at a lower part of a graphite crucible, placing a graphite separator on the starting material for generating gas phase silicon sources, placing a solid phase carbon source at an upper part of the graphite separator, and then closing a cover of the graphite crucible to constitute a reaction system for manufacturing SiC powders; and iii) subjecting the reaction system under vacuum atmosphere or argon atmosphere to perform heat treatment to synthesize the SiC powders.

2. The method of claim 1, wherein in step ii), the graphite separator has a thickness from 0.5 mm to 5 mm and holes having a diameter from 1 mm to 4 mm are present at 4 ea/cm$^2$ to 30 ea/cm$^2$ on a surface thereof.

3. The method of claim 1, wherein the metallic silicon and silicon dioxide powder used in step i) produce silicon gas and silicon monoxide gas by the heat treatment in step iii), and the produced silicon gas and silicon monoxide gas pass through the holes of the graphite separator and are reacted with the carbon source placed at the upper part thereof to prepare the SiC powders.

4. The method of claim 1, wherein in step i), the thermoplastic resin is used in a range from 0.2% by weight to 2% by weight based on the starting material for generating gas phase silicon sources.

5. The method of claim 1, wherein in step i), the thermoplastic resin is one selected from phenol resins, phenol resins, polyethylene resins, and acrylic resins.

6. The method of claim 1, wherein in step i), the mixing is performed as a process of adding water or ethanol in an amount from 20% by weight to 40% by weight and then stirring the mixture at a speed from 100 rpm to 400 rpm and the drying is performed at a temperature from 60° C. to 90° C.

7. The method of claim 1, wherein in step ii), a C/Si element molar ratio of the silicon source and the carbon source to be charged in the crucible is in the range from 0.7 to 2.0/1.

8. The method of claim 1, wherein in step iii), the heat treatment is performed under vacuum atmosphere at a temperature from 1,200° C. to 1,400° C. for 1 hour to 5 hours, and then under vacuum or argon atmosphere at a temperature from 1,700° C. to 2,100° C. for 1 hour to 5 hours.

9. The method of claim 1, wherein the SiC powders are prepared in the form of beta phase SiC powders having an average diameter from 1 μm to 20 μm or a mixture of beta and alpha phase SiC powders having an average diameter from 30 μm to 50 μm.

* * * * *